United States Patent
Busato et al.

(10) Patent No.: US 8,333,362 B2
(45) Date of Patent: Dec. 18, 2012

(54) PRESSURE COMPENSATING METHOD

(75) Inventors: Murray F. Busato, Clinton Township, MI (US); Robert J. Telep, Livonia, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 1231 days.

(21) Appl. No.: 12/085,859

(22) PCT Filed: Nov. 30, 2006

(86) PCT No.: PCT/US2006/045899
§ 371 (c)(1),
(2), (4) Date: May 30, 2008

(87) PCT Pub. No.: WO2007/064823
PCT Pub. Date: Jun. 7, 2007

(65) Prior Publication Data
US 2009/0045364 A1    Feb. 19, 2009

Related U.S. Application Data

(60) Provisional application No. 60/741,259, filed on Dec. 1, 2005.

(51) Int. Cl.
*F16K 31/02*    (2006.01)

(52) U.S. Cl. .............. 251/129.07; 251/129.15; 251/281; 251/129.17

(58) Field of Classification Search ............. 251/129.01, 251/129.07, 129.15, 281, 282, 129.17
See application file for complete search history.

(56) References Cited

U.S. PATENT DOCUMENTS

| | | | | |
|---|---|---|---|---|
| 3,446,471 A | * | 5/1969 | Westphal | 251/129.17 |
| 3,684,238 A | | 8/1972 | Gian et al. | |
| 5,967,487 A | * | 10/1999 | Cook et al. | 251/129.07 |
| 6,505,812 B1 | * | 1/2003 | Anastas | 251/129.07 |
| 6,604,726 B2 | * | 8/2003 | Kumar | 251/129.16 |
| 7,028,978 B2 | * | 4/2006 | Kumar | 251/129.15 |

FOREIGN PATENT DOCUMENTS

| | | |
|---|---|---|
| DE | 102 00 915 | 10/2002 |
| EP | 1 160 493 | 12/2001 |
| FR | 2 649 465 | 1/1991 |

* cited by examiner

*Primary Examiner* — Steven J Ganey
(74) *Attorney, Agent, or Firm* — Warn Partners, P.C.

(57) ABSTRACT

A control valve (32) that has a valve (34) that moves in relation to a rigid pressure balancing component (33). The pressure balancing component (33) and the valve (34) are connected by a valve insert (47). The control valve (32) has a pressure balancing component (33) in order for a similar pressure to be applied to both the pressure balancing component (33) and the valve (32). Use of a rigid material will increase the durability of the pressure balancing component (33). The pressure balancing component (33) is formed as part of the actuator (31) or part of the armature (45).

25 Claims, 2 Drawing Sheets

PRESSURE COMPENSATING METHOD

CROSS-REFERENCE TO RELATED APPLICATIONS

This application is a National Stage of International Application No. PCT/2006/045899 filed on Nov. 30, 2006. This application claims the benefit of U.S. Provisional Application No. 60/741,259, filed Dec. 1, 2005. The disclosure of the above application is incorporated herein by reference.

FIELD OF THE INVENTION

The present invention relates to a control valve with a pressure balancing component that communicates a pressure such that a similar pressure is placed on a pressure balancing component and a valve.

BACKGROUND OF THE INVENTION

Actuators are commonly used to control a variety of devices. The actuator provides the force needed to move and position a valve. The pressure differential between the inlet and outlet, which causes flow through the valve, can produce a force on the valve that opposes the force of the actuator. This may require the use of a larger and more expensive actuator. The force, caused by the pressure differential, can be reduced by using a diaphragm with a flexible convolute. The outer circumference of the diaphragm is secured and sealed within the actuator/valve. The inner portion of the diaphragm is secured and sealed to a moving component associated with the valve such as the valve stem or armature. The flexible convolute of the diaphragm will allow the valve to move through its stroke.

A sealed cavity above the diaphragm will receive the same pressure that is applied to the valve at the inlet. A passageway may be formed in a component such as a valve insert. The effective area of the diaphragm and the area valve are made approximately equal. The forces, caused by the pressure, acting on the valve and diaphragm will cancel each other and reduce or eliminate the need for a higher force actuator. A disadvantage of the diaphragm is potential damage to the convolute caused by high pressure and the stress of movement.

If the pressure is high, the diaphragm may balloon and be damaged. If this occurs, the result may be a failure that would cause the valve to open or have leakage between the valve inlet and outlet. Therefore, it would be desirable to have to have a method of balancing the pressure without using a diaphragm.

SUMMARY OF THE INVENTION

The present invention relates to a control valve that has a valve that moves in relation to a pressure balancing component. The pressure balancing component and the valve are connected by a valve insert. The control valve has a pressure balancing component in order for a similar pressure to be applied to both the pressure balancing component and the valve. The opposing forces will cancel each other and reduce the force needed to actuate the valve. The pressure balancing component can be made of a rigid material which increases its durability. The pressure balancing component is formed as part of an actuator or part of the moving part of the actuator such as the armature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
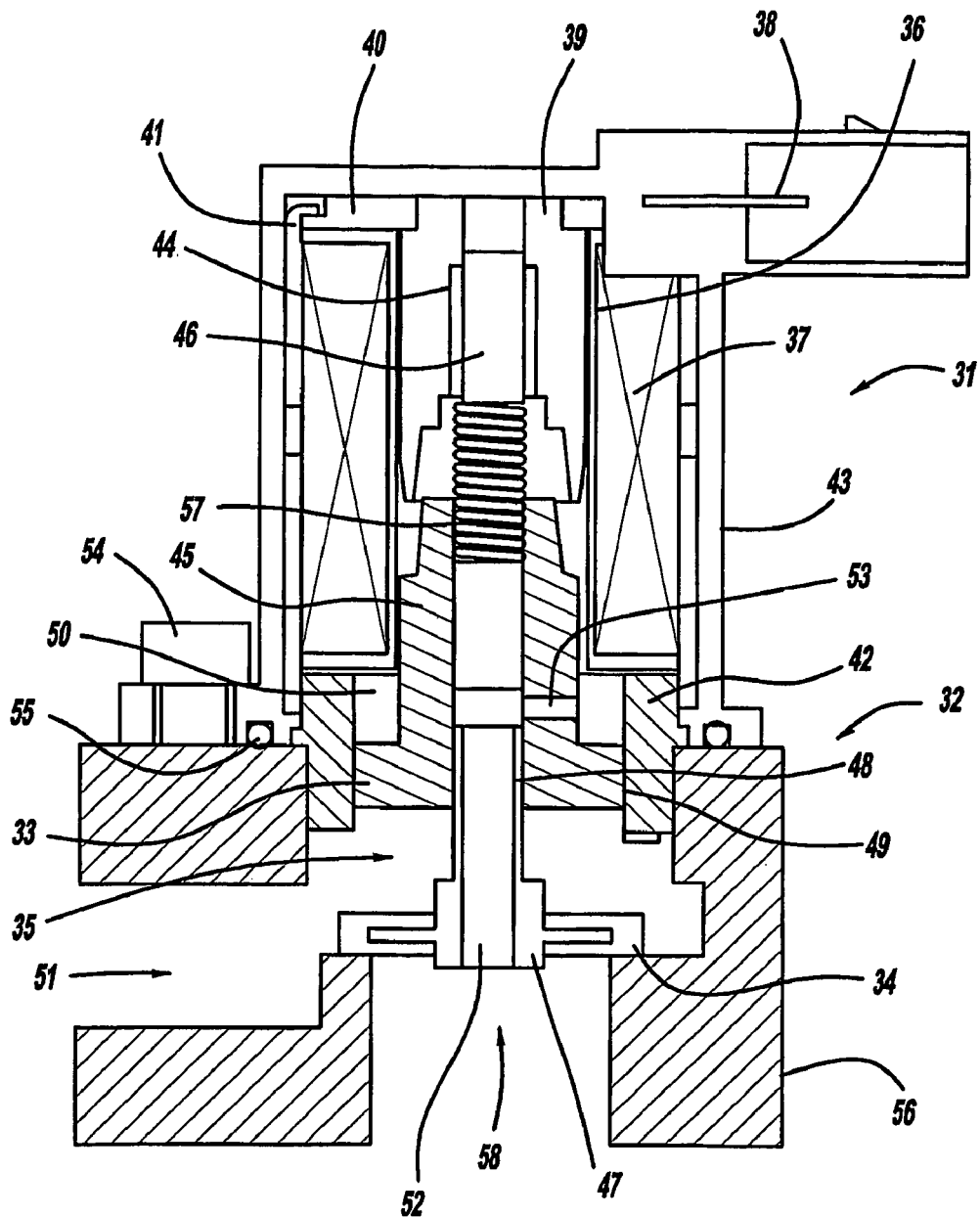
FIG. 1 is a cross sectional plan view of an actuator and a control valve.
Figure 2:
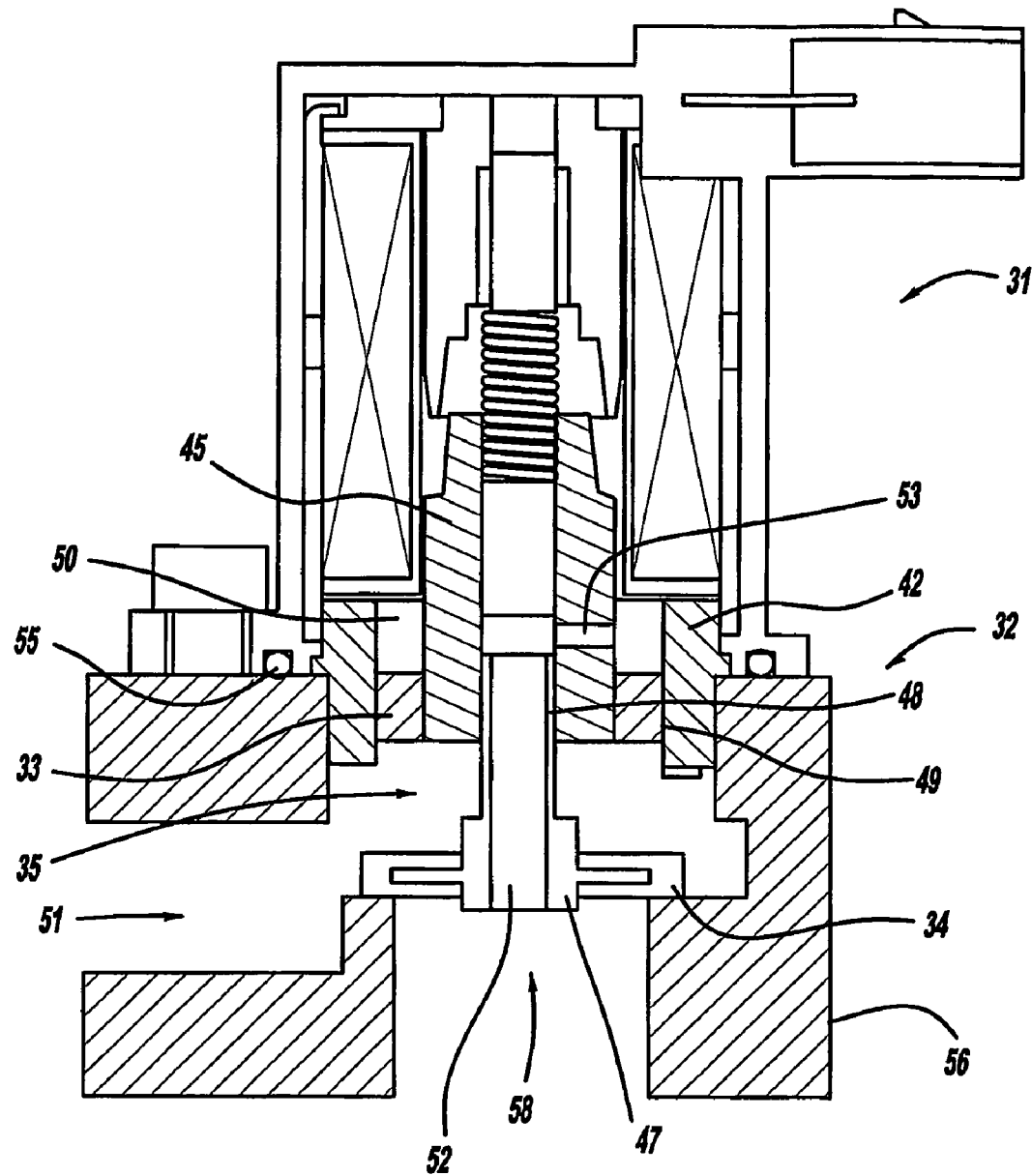
FIG. 2 is a cross sectional plan view of an alternate embodiment of an actuator and a control valve.

Referring to FIG. 1, an actuator is generally shown at 31 and a control valve is generally shown at 32. The actuator 31 and the control valve 32 have a pressure balancing component 33, which is used for pressure compensation. The pressure balancing component 33 is made of a rigid material in order to make it more durable. Materials such as steel, brass, bronze, aluminum or plastic may be used. A valve insert 47 has a valve portion 34 that is overmolded with an elastomeric material. The valve insert 47 has a valve portion 34 is overmolded with an elastomeric material. The pressure balancing component 33 and the valve 34 will have approximately the same diameter so that pressure acting on the valve 34 area is countered by the pressure acting on the pressure balancing component 33 area. This causes the control valve 32 to be balanced.

The actuator 31 has a bobbin 36 that is wound with magnetic wire 37 and terminated by terminals 38. The bobbin 36 has a magnetic structure comprising a pole piece 39, a pole piece washer 40, a case 41, and a flux piece 42. The actuator 31 and all of the components of the actuator 31 are encapsulated in a plastic overmold 43.

The pole piece 39 has a counterbore that receives a bushing 44. Coaxial to the pole piece 39 is an armature 45, and a stem 46 that extends from a bore on said armature 45 in order to slide fit with the bushing 44. Stem 46 is shown as a separate part that is press fit to armature 45. It can also be formed as a portion of the valve insert 47 by extending the shaft portion 48 of valve insert 47. Then the pressure balancing component 33 can be slide fitted to the overmold 43 in a bore 49 within the flux piece 42. There is a close fit between the outside diameter of the pressure balancing component 33 and the inside diameter of the bore 49 in order to control the amount of leakage of flow that can pass through the annular clearance.

The actuator 31 is installed on a valve body 56 and retained by fasteners 54. An o-ring 55 provides a seal between the actuator 31 and the valve body 56. Furthermore, a compression spring 57, which is coaxial to the stem 46 and bushing 44, provides a bias force that will seat the valve 34 on a seat in the valve body 56 and block the flow between a valve body inlet 58 and a valve body outlet 51.

Therefore, when sufficient electrical current is applied to the terminals 38, a magnetic field, and the created magnetic force, will cause the armature 45, and associated valve components to move in an axial direction away from the valve seat. This results in a flow between the inlet 58 and the outlet 51, when the valve insert 47 and seal 34 move away from the seat in the valve body 56.

Moreover, a pressure balancing method is used to apply a similar pressure to both the pressure balancing component 33 and the valve 34. The pressure balancing component 33 separates chambers 50 and 35, within the overmold 43, and outlet 51. The valve insert 47, the stem 48, and the armature 45 have passageways 52, 53 in order to communicate pressure. Thus, the pressure that is applied to the area of the valve insert 47 and the valve 34 is communicated to the chamber 50 and the pressure balancing component 33. The resulting force acting on the valve insert 47 and valve 34 will be opposed and balanced by the resulting force on the pressure balancing component 33. This further results in that actuator 31 operating at a reduced force, since the rigid pressure balancing component 33 is used for pressure compensation.

Referring to FIG. 3, an alternate embodiment of the actuator 31 and the control valve 32 is shown. In this embodiment, the pressure balancing component 33 is a separate part from the armature 45. Thus, the pressure balancing component 33 and the armature 45 are connected to one another, preferably by being press fitted or by some other suitable connection method. This will allow for an alternate manufacturing process for the components and an assembly that may be more efficient.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control valve comprising:
a valve body having an inlet and outlet with a valve member disposed between said inlet and outlet;
an actuator operably connected to said valve; and
a rigid pressure balancing component of said actuator, wherein said rigid pressure balancing component is formed of rigid material and defines one or more chambers, wherein said rigid pressure balancing component is a portion of a load bearing surface of said actuator.

2. The control valve of claim 1 wherein said one or more chambers receives the same pressure as that which is applied to said valve member.

3. The control valve of claim 1 wherein said rigid pressure balancing component is operably connected to said valve body.

4. The control valve of claim 1 wherein said rigid pressure balancing component is integrated with a moving component of said actuator.

5. A control valve comprising:
a valve body having an inlet and an outlet with a valve member disposed between the inlet and outlet;
an actuator operably connected to said valve;
a moving component of an actuator that is an armature; and
a rigid pressure balancing component of said actuator integrated with said moving component of said actuator, wherein said rigid pressure balancing component is formed of rigid material and defines one or more chambers.

6. A control valve comprising:
a valve body having an inlet and an outlet with the valve member disposed between said inlet and outlet;
an actuator operably connected to said valve, wherein said actuator has a moving component;
a rigid pressure balancing component integrated with said moving component of said actuator, wherein said rigid pressure balancing component is formed of rigid material and defines one or more chambers and said rigid pressure balancing component is a separate component attached to said moving component of said actuator.

7. The control valve of claim 6 wherein said moving component of said actuator is an armature.

8. The control valve of claim 1 wherein said rigid pressure balancing component is located within a magnetic portion of said actuator.

9. The control valve of claim 8 wherein said magnetic portion includes at least one of a wound coil, a bobbin, an armature, a pole piece, a pole piece washer, a case or a flux piece.

10. The control valve of claim 1 wherein said valve and said rigid pressure balancing component have approximately the same area exposed to a pressure source.

11. The control valve of claim 1 wherein said rigid pressure balancing component is contained within said actuator.

12. A control valve comprising:
a valve body having an inlet and outlet with a valve member disposed between said inlet and outlet;
an actuator operably connected to said valve;
a rigid pressure balancing component contained within said actuator, wherein said rigid pressure balancing component is formed of a rigid material and defines one or more chambers, wherein said rigid pressure balancing component is operably connected to said valve.

13. A control valve comprising:
an armature;
a valve body having an inlet and an outlet with a valve member disposed between said inlet and outlet, wherein said valve member defines an area and moveable with said armature; and,
a rigid pressure balancing component connected to said armature and forming part of one or more chambers, wherein said pressure balancing component is formed of rigid material and defines an area that is moveable with said armature and creates a similar pressure on both said rigid pressure balancing component and said valve member.

14. The control valve of claim 13, wherein said rigid pressure balancing component and said valve body are connected by a valve insert.

15. The control valve of claim 13 further comprising a valve insert, a stem, and an armature, wherein said valve insert, said stem, and said armature have at least one passageway so that pressure can be communicated through said at least one passageway for said pressure balancing component to function.

16. The control valve of claim 13 further comprising an actuator, wherein said pressure balancing component is part of said actuator.

17. The control valve of claim 16, wherein said rigid pressure balancing component is a portion of a load bearing surface of said actuator.

18. The control valve of claim 16, wherein said rigid pressure balancing component is part of a magnetic portion of said actuator.

19. The control valve of claim 18, wherein said magnetic portion includes at least one of a wound coil, a bobbin, an armature, a pole piece, a pole piece washer, a case or a flux piece.

20. A control valve comprising:
an actuator;
a rigid pressure balancing component formed of rigid material, wherein said pressure balancing component is part of said actuator and at least partially defines a chamber in said actuator;

a valve member, wherein said rigid pressure balancing component and said valve member are connected by a valve insert, wherein a similar pressure is applied to both said rigid pressure balancing component and said valve member.

21. The control valve of claim 20 further comprising a valve insert, a stem, and an armature, wherein said valve insert, said stem, and said armature have at least one passageway so that pressure can be communicated through said at least one passageway for said pressure balancing component to function.

22. The control valve of claim 20, wherein said rigid pressure balancing component is part of said actuator.

23. The control valve of claim 20, wherein said rigid pressure balancing component is a portion of a load bearing surface of said actuator.

24. The control valve of claim 20, wherein said rigid pressure balancing component is part of a magnetic portion of said actuator.

25. The control valve of claim 24, wherein said magnetic portion includes at least one of a wound coil, a bobbin, an armature, a pole piece, a pole piece washer, a case or a flux piece.

* * * * *